United States Patent

Ecker et al.

Patent Number: 5,354,073
Date of Patent: Oct. 11, 1994

[54] HOUSING COVER HAVING DEFORMATION PREVENTING MEANS

[75] Inventors: Rainer Ecker, Leverkusen; Bernd Stephan, Remscheid; Hans-Joachim vom Stein, Wermelskirchen, all of Fed. Rep. of Germany

[73] Assignee: Goetze AG, Burscheid, Fed. Rep. of Germany

[21] Appl. No.: 929,951

[22] Filed: Aug. 17, 1992

[30] Foreign Application Priority Data

Aug. 16, 1991 [DE] Fed. Rep. of Germany ....... 4127067

[51] Int. Cl.$^5$ .................................................. F16J 15/10
[52] U.S. Cl. ................................... 277/235 R; 277/180
[58] Field of Search ............... 277/235 R, 235 B, 180, 277/152, 153

[56] References Cited

U.S. PATENT DOCUMENTS

| | | |
|---|---|---|
| 3,053,544 | 9/1962 | Gorsica ................................ 277/180 |
| 3,352,564 | 11/1967 | Johnson ........................... 277/235 B |
| 3,531,168 | 9/1970 | Bainard ................................ 277/153 |
| 4,272,085 | 6/1981 | Fujikawa et al. ..................... 277/180 |
| 4,484,751 | 11/1984 | Deuring ............................... 277/153 |
| 4,928,980 | 5/1990 | Deuring . | |
| 5,080,379 | 1/1992 | Zimmermann et al. ........ 277/235 R |
| 5,131,668 | 7/1992 | Uchida ................................. 277/180 |

FOREIGN PATENT DOCUMENTS 3634735 6/1989 Fed. Rep. of Germany .

Primary Examiner—William A. Cuchlinski, Jr.
Assistant Examiner—Daniel G. DePumpo
Attorney, Agent, or Firm—Spencer, Frank & Schneider

[57] ABSTRACT

A housing cover for closing an open side of a housing includes a dish-shaped sheet metal cover body provided with a central opening for the passage of a shaft; a bottom plate forming part of the cover body and having opposite first and second radial surfaces; and a plurality of spaced holes in the bottom plate for providing passages for respective bolts, each having a bolt head with an underface, for securing the cover body to the housing. In an installed state of the housing cover, the first radial surface of the bottom plate is oriented towards the housing and the second radial surface of the bottom plate is oriented towards the underface of the respective bolt. The housing cover further has a static sealing strip supported on the first radial surface for engagement with a housing face in an installed state of the housing cover on the housing; and a sheet metal insert connected to the sheet metal body and being in a face-to-face engagement with one of the radial surfaces of the bottom plate in a region of the holes for the bolts.

9 Claims, 3 Drawing Sheets

HOUSING COVER HAVING DEFORMATION PREVENTING MEANS

CROSS REFERENCE TO RELATED APPLICATION

This application claims the priority of German Application No. P 41 27 067.3 filed Aug. 16, 1991, which is incorporated herein by reference.

BACKGROUND OF THE INVENTION

This invention seeks to improve a housing cover to be secured to a housing, particularly a crankcase of an internal combustion engine for an automotive vehicle. The conventional housing cover has a central opening through which a shaft, such as the engine crankshaft, may pass. The opening has an axis which is oriented perpendicularly to the plane of the central opening. The housing cover is of the type that is made of a drawn sheet metal body which is generally dish-shaped and which has axially offset radial surfaces. The bottom plate of the sheet metal body has bore holes for the passage of securing bolts. The bottom plate contains a first radial surface. A second radial surface of the housing cover is radially spaced from and is axially offset relative to the first surface and serves for receiving a static sealing strip which may be vulcanized thereto. The housing cover further supports a circular lip seal which bounds the central opening and which serves for sealing the shaft.

German Patent No. 3,634,735, to which corresponds U.S. Pat. No. 4,928,980, discloses a housing cover of the above-outlined type. The housing cover is made of a drawn sheet metal body which is essentially dish-shaped and has three radial surfaces disposed in different axial planes and which are at a stepped relationship to one another. The static seal is disposed on the second radial surface and is vulcanized thereto. In the installed state the dish-shaped sheet metal housing cover is, with its radial face that constitutes a bottom face, tightened against the housing with the aid of bolts passing through bore holes.

The elastomer sealing strip engaging the second radial surface of the known housing cover axially projects therefrom in the non-installed, separated state such that it extends beyond the first radial surface of the cover body. Upon tightening the housing cover the sealing strip is axially pressed against the housing to be sealed. In the cover body a free space has to be provided into which the elastomer material which, in itself, is incompressible, may yield. Such a free space is obtained by the step-like offset of the first and second radial surfaces and thus the sealing strip may expand radially inwardly. By virtue of this construction the first radial surface (bottom surface) may be firmly bolted to the housing without damaging or destroying the static seal.

It is a disadvantage of the conventional housing cover described above that upon installation thereof care has to be taken that the head of the securing bolt has a planar seat, that is, the bolt head must not lie on the transition zone between the first and the second radial surfaces because in such a case the transitional region is deformed by the tightening, whereupon the volume of the free space necessary for accommodating the yielding elastomer material is reduced. To avoid such a reduction in volume, the bore holes provided in the housing cover must be radially outwardly displaced to such an extent that the standard bolt does not contact, with the underface of the bolt head, the transitional zone leading to the second radial surface. It has been found, however, that in numerous internal combustion engines the space for installation is not sufficiently large to admit a housing cover in which the bolt openings (bore holes) are provided relatively far out in the radial direction, that is, relatively close to the peripheral edge of the housing cover.

SUMMARY OF THE INVENTION

It is an object of the invention to provide an improved housing cover of the above-discussed type in which the described deformation phenomena are eliminated and which, nevertheless, may be utilized in engines having a narrow space for installation.

This object and others to become apparent as the specification progresses, are accomplished by the invention, according to which, briefly stated, the housing cover for closing an open side of a housing includes a dish-shaped sheet metal cover body provided with a central opening for the passage of a shaft; a bottom plate forming part of the cover body and having opposite first and second radial surfaces; and a plurality of spaced holes in the bottom plate for providing passages for respective bolts, each having a bolt head with an underface, for securing the cover body to the housing. In an installed state of the housing cover, the first radial surface of the bottom plate is oriented towards the housing and the second radial surface of the bottom plate is oriented towards the underface of the respective bolt. The housing cover further has a static sealing strip supported on the first radial surface for engagement with a housing face in an installed state of the housing cover on the housing; and a sheet metal insert connected to the sheet metal body and being in a face-to-face engagement with one of the radial surfaces of the bottom plate in a region of the holes for the bolts.

By providing a sheet metal insert on the bottom plate of the cover body, in the zone of the bore holes for the bolts the strength of the sheet metal cover body is increased. Furthermore, a planar seat for the underface of the bolt head is provided which makes it possible to arrange the bore holes radially further inwardly than before, that is, up to the zone of the elastomer sealing strips. The bolt head then is situated axially behind the static seal and thus, upon tightening of the bolts, the transitional zone between the first and the second radial surfaces is not deformed.

According to a further feature of the invention, the sheet metal insert is situated on that surface of the bottom plate which is oriented towards the housing, that is, away from the bolt head in the installed state. This makes possible a simple drawn contour of the sheet metal body because no additional stepping is needed for receiving the sealing strip. The static seal (sealing strip) is vulcanized to that surface of the bottom plate which is oriented away from the bolt head in the installed state. The required free space for the sealing strip is thus obtained by virtue of the particular disposition of the sheet metal insert.

According to a further feature of the invention, the sheet metal insert is situated at the outer periphery of the cover body and is, by segmentwise bending thereof along a fold line, folded onto the bottom surface. In this manner the sheet metal insert may be formed at an early stage on the sheet metal body blank so that upon the drawing operation the desired disposition of the sheet metal insert is obtained.

Alternatively, the sheet metal insert may be a separate component which is connected with the housing cover body after the drawing thereof. In order to ensure a uniform seating on the housing, it is advantageous to arrange the sheet metal insert in the circumferential direction along the entire length of the sealing strip. Preferably, the sheet metal insert should be at least as thick as the housing cover body.

According to a further advantageous feature of the invention, the sheet metal insert extends radially up to the static sealing strip. This arrangement provides the possibility of utilizing the static seal as a securing means, since as a result of vulcanizing the sprayed-in sealing strip, the latter connects the bottom plate with the sheet metal insert.

DESCRIPTION OF THE PREFERRED EMBODIMENTS

Figure 7:
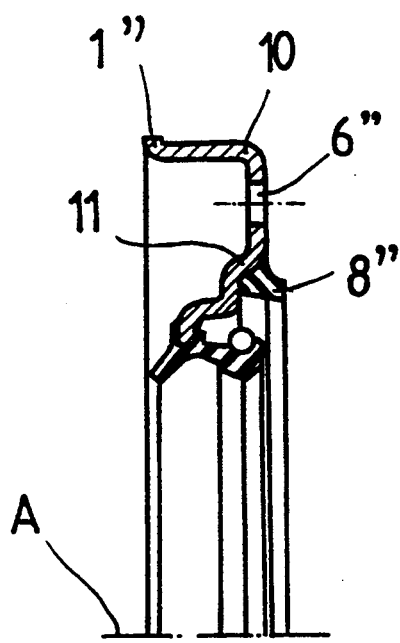
FIG. 7 is a sectional elevational view of a prior art construction.

Turning first to FIG. 7, there is illustrated therein a conventional housing cover made of drawn sheet metal and used for closing an axial open end of a crankcase in an internal combustion engine of an automotive vehicle. By virtue of its structure, the housing cover of this type is adapted for installation where only a narrow radial structural space is available under the hood. The radial distance between the central axis A of the housing cover and the hole 6″ provided in the marginal circumferential zone of the housing cover for allowing passage of a securing bolt (not shown in FIG. 7) may not be shortened because the hole 6″ cannot be relocated radially inwardly. The securing bolt requires a planar bolt head seat to avoid deformation of the relatively thin sheet metal body 10 when the bolt engages the annular transitional zone 11.

Figure 1:
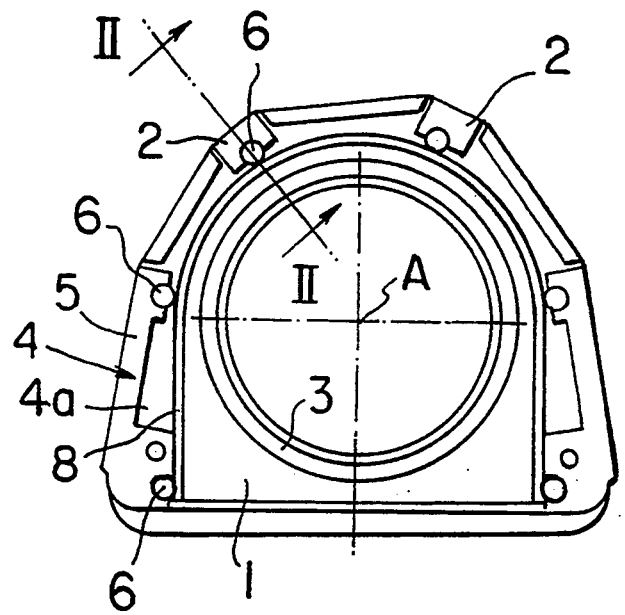
FIG. 1 is a front elevational view of a preferred embodiment of the invention.

In order to solve such a problem, according to the invention, the sheet metal housing cover body 1 is, as shown in FIG. 1, provided with a sheet metal insert 2 at the periphery of the housing cover. The sheet metal insert 2 forms a one-piece construction with the cover body 1. The cover body 1 has a bottom plate 4 provided with a plurality of bore holes 6 for the passage of securing bolts. The sheet metal insert 2 is pressed against the radial surface 4a of the bottom plate 4 of the cover body 1 after being folded over along a fold line. The sheet metal insert 2 is so shaped that it does not overlap the bore holes 6. By the folding over of the sheet metal insert 2, an outer radial surface 5 is formed which engages the housing (not shown) and is axially offset (stepped) from the bottom plate 4. The cover body 1 is provided with a central opening for the passage of a non-illustrated shaft (such as a crankshaft). The housing cover axis coincides with the axis A which is perpendicular to the plane of the central opening.

Figure 2:
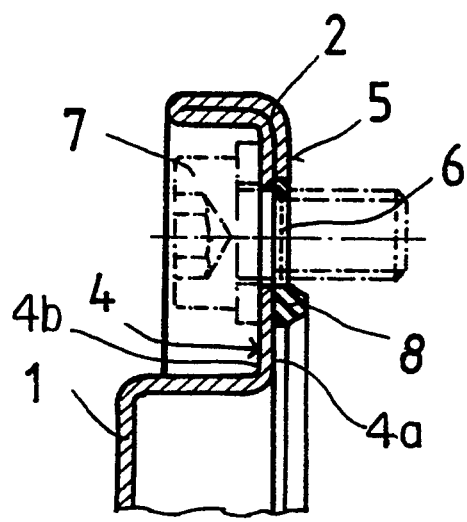
FIG. 2 is a sectional view taken along line II—II of FIG. 1.

In FIG. 2, the position of a securing bolt 7 (shown in phantom lines) in engagement with an annular portion of the radial surface 4b of the bottom plate 4 is illustrated. The annular portion is part of an annular bottom plate zone bounding the bore hole through which the securing bolt 7 passes. By virtue of the arrangement of the sheet metal insert 2, a planar bolt head seat is provided which makes it possible to press the housing cover body 1 against the housing without deformation. The sheet metal insert 2 produces the functionally required offset between the bottom plate 4 and the radial surface 5. Upon tightening the bolt 7 the sealing strip 8 may yield in the radial direction. In this manner, the radial distance between the housing axis A and the bore hole 6 may overall be less than in the prior art construction as shown in FIG. 7, because the entire radial surface 4b of the bottom plate 4 is available as a planar radial surface.

As shown in FIG. 2, the sealing strip 8 is situated underneath the bolt head, axially separated therefrom by the thickness of the bottom plate 4. Stated differently, the bore hole 6 may be in the immediate radial vicinity of the sealing strip 8 and, as a result, the axial distance may be set to approximately the axial distance between the sealing strip 8 and the housing cover axis A. The sealing strip 8 lies on one part of the above-described annular bottom plate zone, while the sheet metal insert lies on another part of that zone effectively increasing there the thickness of the bottom plate 4.

Figure 3:
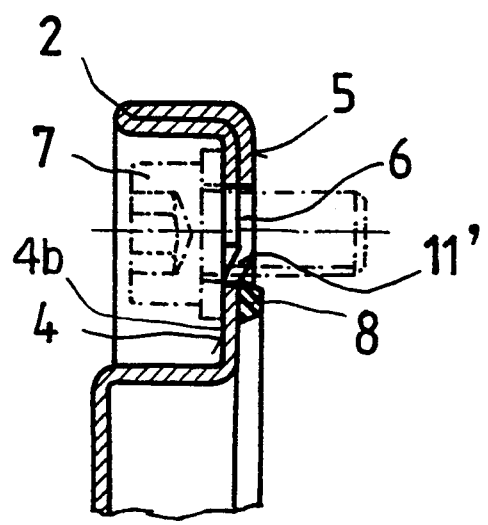
FIG. 3 is a sectional view similar to FIG. 2, illustrating another preferred embodiment of the invention.

In FIG. 3, the sheet metal insert 2 is folded onto the radial surface 4b of the bottom plate 4. In this embodiment, the cover body 1 has to be provided with a dual bend 11′ for receiving the sealing strip 8. By folding over the sheet metal insert 2 onto the radial surface 4b (which is the surface oriented towards the underface of the bolt head), the offset formed by the dual bend 11′ on the side of the bolt head is compensated for.

Figure 4:
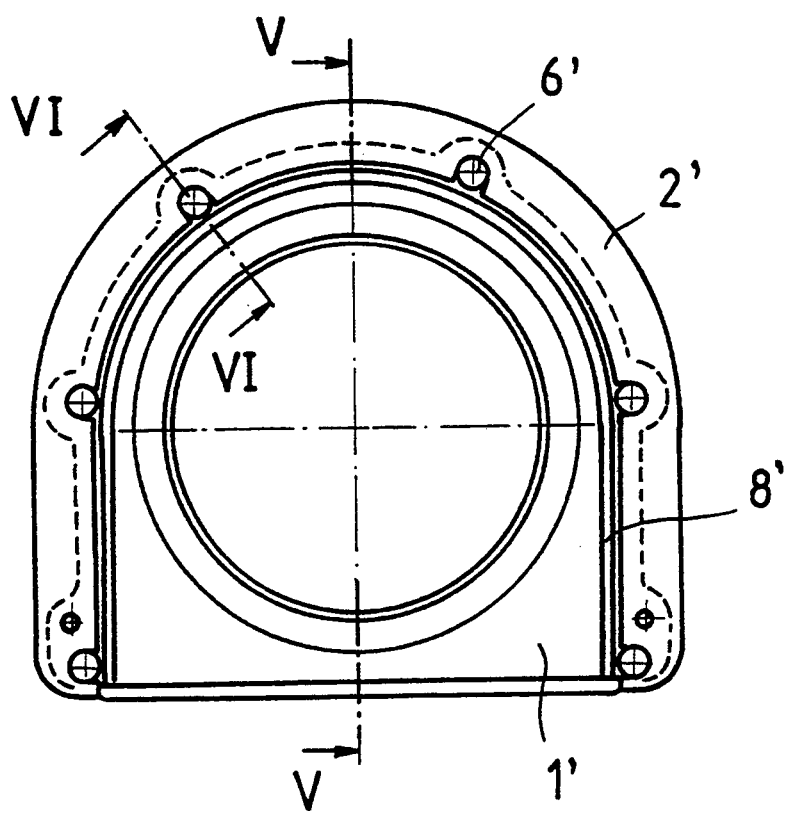
FIG. 4 is a front elevational view of yet another preferred embodiment of the invention.
Figure 5:
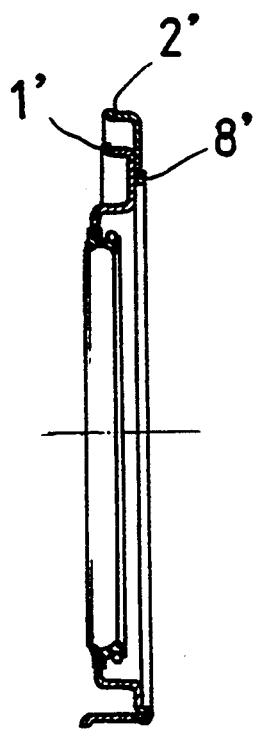
FIG. 5 is a sectional view taken along V—V of FIG. 4.
Figure 6:
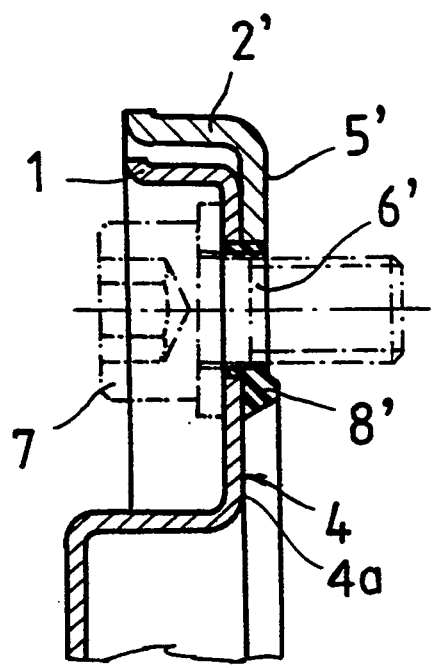
FIG. 6 is a sectional view taken along VI—VI of FIG. 4.

In FIG. 4 the sheet metal insert 2′ is provided as a separate structural component and is connected with the housing cover body 1′ after deep-drawing. The connection between the two sheet metal members 1′ and 2′ is effected at the seal 8′ formed immediately at the radially inner edge zone of the sheet metal insert 2′ as illustrated in FIGS. 5 and 6.

By means of varying the material thickness of the sheet metal insert 2′, the required offset between the radial surface 4a and the outer radial face 5′ of the insert 2′ may be set. The sheet metal insert 2′ extends along the circumference of the housing cover body 1′ so that the edges of the bore holes 6′ are covered thereby.

It will be understood that the above description of the present invention is susceptible to various modifications, changes and adaptations, and the same are intended to be comprehended within the meaning and range of equivalents of the appended claims.

What is claimed is:

1. A housing cover for closing an open side of a housing; the housing cover comprising
   (a) a dish-shaped sheet metal cover body provided with a central opening having a plane and an axis oriented perpendicularly to said plane; said central opening providing a passage for a shaft;

(b) a bottom plate forming part of the cover body and being oriented radially relative to said axis; said bottom plate having opposite first and second radial surfaces;

(c) a plurality of spaced holes in said bottom plate for providing passages for respective bolts, each bolt having a bolt head with an underface, for securing the cover body to the housing; in an installed state of the housing cover said first radial surface of said bottom plate being oriented towards the housing and the second radial surface of said bottom plate being oriented towards the underface of the respective bolt; each hole being bounded by an annular zone of said bottom plate; each annular zone having an annular surface portion of said second radial surface and being covered by the underside of the respective bolt in the installed state of the housing cover; each annular zone having an annular surface portion of said first radial surface;

(d) a static sealing strip supported on said first radial surface for engagement with a housing face in an installed state of the housing cover on a housing; said sealing strip covering a part of each said annular surface portion of said first radial surface; and (e) a sheet metal insert connected to said sheet metal body and being in a face-to-face engagement with one of the radial surfaces of said bottom plate in said annular zone.

2. The housing cover as defined in claim 1, wherein said sheet metal insert is in a face-to-face engagement with said annular surface portion of said first radial surface.

3. The housing cover as defined in claim 1, wherein said sheet metal insert is in a face-to-face engagement with said annular surface portion of said second radial surface.

4. The housing cover as defined in claim 1, wherein said cover body has a periphery; said sheet metal insert being formed in segments on said cover body at said periphery thereof and being folded over onto said bottom plate.

5. The housing cover as defined in claim 1, wherein said sheet metal insert is a component separate from said cover body.

6. The housing cover as defined in claim 1, wherein said static sealing strip has a length and said sheet metal insert extends in a peripheral region of said cover body along the entire length of said static sealing strip.

7. The housing cover as defined in claim 1, wherein said sheet metal insert is at least as thick as said cover body.

8. The housing cover as defined in claim 1, wherein said sheet metal insert extends to said static sealing strip and is oriented radially relative to said axis.

9. The housing cover as defined in claim 1, wherein said static sealing strip is vulcanized to said bottom plate and said sheet metal insert.

* * * * *